(12) United States Patent
Vorobiev

(10) Patent No.: US 9,115,999 B2
(45) Date of Patent: *Aug. 25, 2015

(54) METHOD AND SYSTEM FOR MEASURING VEHICLE SPEED BASED ON MOVEMENT OF VIDEO CAMERA

(75) Inventor: Michael Y. Vorobiev, Moscow (RU)

(73) Assignee: Topcon Positioning Systems, Inc., Livermore, CA (US)

( * ) Notice: Subject to any disclaimer, the term of this patent is extended or adjusted under 35 U.S.C. 154(b) by 596 days.

This patent is subject to a terminal disclaimer.

(21) Appl. No.: 13/603,176

(22) Filed: Sep. 4, 2012

(65) Prior Publication Data

US 2012/0327240 A1    Dec. 27, 2012

Related U.S. Application Data

(63) Continuation of application No. 12/989,424, filed as application No. PCT/RU2009/000676 on Dec. 8, 2009, now Pat. No. 8,269,833.

(30) Foreign Application Priority Data

Mar. 10, 2009   (RU) ................................ 2009108360

(51) Int. Cl.
| | |
|---|---|
| *G01C 21/12* | (2006.01) |
| *G01P 3/38* | (2006.01) |
| *G01S 11/12* | (2006.01) |
| *G06T 7/20* | (2006.01) |

(52) U.S. Cl.
CPC . *G01C 21/12* (2013.01); *G01P 3/38* (2013.01); *G01S 11/12* (2013.01); *G06T 7/20* (2013.01); *B60T 2250/04* (2013.01); *G06T 2207/10016* (2013.01); *G06T 2207/30252* (2013.01)

(58) Field of Classification Search
CPC ....... B60T 2250/04; G01C 21/12; G01P 3/38; G01S 11/12; G06T 2207/10016; G06T 2207/30252; G06T 7/20
See application file for complete search history.

(56) References Cited

U.S. PATENT DOCUMENTS

| | | | | |
|---|---|---|---|---|
| 4,709,264 A | * | 11/1987 | Tamura et al. ................. | 358/479 |
| 5,734,337 A | * | 3/1998 | Kupersmit .................... | 340/937 |
| 7,995,192 B2 | * | 8/2011 | Wustefeld ....................... | 356/27 |
| 8,135,175 B2 | * | 3/2012 | Aoki et al. ..................... | 382/104 |
| 2010/0082238 A1 | * | 4/2010 | Nakamura et al. ............. | 701/208 |

FOREIGN PATENT DOCUMENTS

RU    2188432    *  8/2002   ................ G01P 3/68

* cited by examiner

*Primary Examiner* — Anner Holder
(74) *Attorney, Agent, or Firm* — Bardmesser Law Group

(57) ABSTRACT

A digital video camera is placed on a vehicle. The video camera is attached to the vehicle and is directed to a surface at a certain angle to the surface. The camera angle can change while vehicle is in motion. The camera angle is constantly measured by angular sensor (i.e., inclinometer). Images of the surface are projected onto a video matrix and transformed into a sequence of digital frames that are formed at a pre-set time interval. A speed of the video camera relative to the surface is calculated as a ratio of an off-set between the adjacent frames and the time interval between the frames. Then a known relative speed of the vehicle can be corrected by multiplication of the height of the camera (above the surface) by a coefficient that equals a ratio of the known vehicle speed and the measured camera speed.

19 Claims, 3 Drawing Sheets

METHOD AND SYSTEM FOR MEASURING VEHICLE SPEED BASED ON MOVEMENT OF VIDEO CAMERA

CROSS-REFERENCE TO RELATED APPLICATIONS

The present application is a continuation of U.S. patent application Ser. No. 12/989,424, filed on Oct. 25, 2010, which is a U.S. national stage of the PCT/RU2009/000676, filed on Dec. 8, 2009, which claims priority to RU 2009108360, filed on Mar. 10, 2009, which is incorporated herein by reference in its entirety.

BACKGROUND OF THE INVENTION

1. Field of the Invention

The present invention is related to speed measurement technology, and more particularly, to measuring vehicle speed based on movements of a video camera located on a moving vehicle.

2. Description of the Related Art

Navigation based on correlation of extremes is method for measuring vehicle speed relative to an underlying surface. An image of the surface produced by an analog or digital video camera is used as initial information. The video camera is pointed at the surface. The video camera transforms an optical image of the surface projected onto a video matrix into a sequence of digitized image frames. An off-set between the adjacent frames having maximally coinciding images is found.

The information about the time of shooting of each frame allows measuring the speed of movement of the image on the video matrix (sensor). A value of height of location of the video camera relative to the underlying surface allows for calculating the speed of the video camera relative to the surface based the measured speed of the image.

A speed measuring method is disclosed in U.S. Pat. No. 4,162,509. This method uses wireless matrix-based speed measuring device with two optical units. A time interval between image generations by these optical devices is controlled. The speed is calculated by dividing a distance between the optical devices over the controlled time interval. The main disadvantage of this correlation-based method is its low accuracy when the movement is slow or is performed in a reverse direction.

A method for measuring speed of vehicle is disclosed in U.S. Pat. No. 5,734,337. According to this method, changes in positioning of the vehicle in the adjacent frames taking into account the camera angle are used for speed calculation. The camera angle is used for compensation of perspective distortions. The disadvantage of this method is that the camera is firmly fixated on a static platform and the camera angles do not change.

Another speed measuring method is disclosed in U.S. Pat. No. 4,495,589. This method is used for measuring aircraft speed relative to the earth surface. The speed is measured by calculating the off-set in earth surface profile for adjacent image frames taken by the same video camera. This method produces inaccurate measurements when a camera is not oriented exactly perpendicular to the surface due to perspective projection distortions. When a camera is not perpendicular to the surface (i.e., it has some inclination), the image of the surface has a perspective projection distortion— http**en.wikipedia.org/wiki/Perspective_projection_distortion.

It is apparent that improved method for determining speed of the camera is desired.

Accordingly, there is a need in the art for a system and method that addresses the need for efficient and precise determination of camera and vehicle speed.

SUMMARY OF THE INVENTION

The present invention is intended as a method and system for measuring vehicle speed based on movement of a video camera attached to the vehicle that substantially obviates one or several of the disadvantages of the related art.

In one aspect of the invention a digital camera is placed on a vehicle. The video camera is attached to the vehicle and is directed to a surface at a certain angle or perpendicular to the surface. The camera angle can change while vehicle is in motion. The camera angle is constantly measures by angular sensor (i.e., inclinometer). Images of the surface are projected onto a video matrix and transformed into a sequence of digital frames that are formed at a pre-set time interval.

A speed of the video camera relative to the surface is calculated as a ratio of an off-set between the adjacent frames and the time interval between the frames. Then a known relative speed of the vehicle can be corrected by multiplication of the height of the camera (over the surface) by a coefficient that equals a ratio of the known vehicle speed and the measured camera speed.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention.

DETAILED DESCRIPTION OF THE PREFERRED EMBODIMENTS

Figure 1:
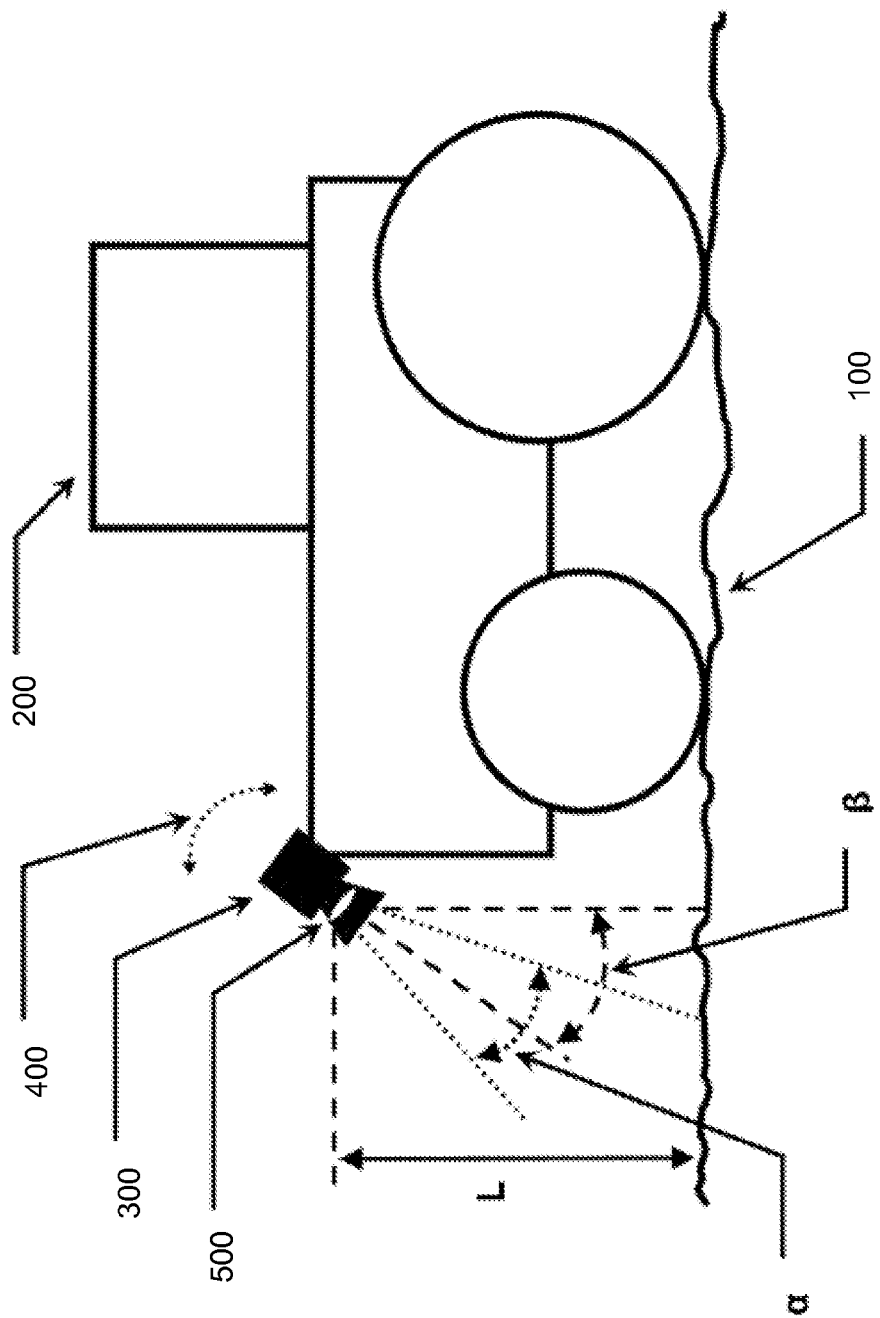
FIG. 1 illustrates a side view of a video camera located on a vehicle, in accordance with the exemplary embodiment.

Reference will now be made in detail to the preferred embodiments of the present invention, examples of which are illustrated in the accompanying drawings.

According to the exemplary embodiment, a method and system for measuring vehicle speed based on movement of a video camera attached to the vehicle are provided.

In one aspect of the invention a digital camera is placed on a vehicle. The video camera is attached to the vehicle and is aimed towards a surface at a certain angle or perpendicular to the surface. The camera angle can change while vehicle is in motion. The camera angle is constantly measures by angular sensor (i.e., inclinometer). Images of the surface are projected onto a video matrix and transformed into a sequence of digital frames that are formed at pre-set time intervals. The time interval is typically a property of the camera, but it can have a slight difference from one camera to another. A clock of the CPU can be used to measure the time interval with high precision.

A speed of the video camera relative to the surface is calculated as a ratio of an off-set between the adjacent frames and the time interval between the frames. Transformation of the initial surface image (analog or infra-red) into a color image includes:

filtering of the initial image;

transforming the image into black and white form using grey scale or into a binary black and white image, where each pixel of the matrix contains only one bit of the initial image.

After each image frame is generated, it is processed for reduction of current perspective distortions based on the information about the current matrix angles, camera view angle and camera height relative to the surface. Additionally, the image frame can be corrected for spherical aberration of camera lens. Then, for each pair of the adjacent video frames n and n−1, a relative position of the camera where the images have maximum coincidence is found.

The coordinates of this position have discrete values because of discrete nature of image presentation as an array of pixels. The maximum position can be corrected by approximation of the correlation peak of mathematical function (i.e., for example, parabolic function, which is the most suitable and popular for peak approximation, although other functions are also possible). In order to correct the maximum position, a number of values of the correlation peak are calculated in the neighborhood area of its maximum value.

Based on these values, parameters of the approximation function are calculated. Then, maximum coordinates ($X_m$, $Y_m$) for the function are calculated. At this point, the off-set ($X_{off}$, $Y_{off}$) between the adjacent image frames n and n−1 is calculated. The offset is defined by difference in camera angles at the moment of capturing these image frames.

An off-set (i.e., traveled distance) of the earth surface (X, Y) based on camera movement is calculated as a difference between the maximum of correlation for the current pair of image frames and the off-set between these frames:

$$X = X_m - X_c$$

$$Y = Y_m - Y_c$$

The camera speed relative to the earth surface is calculated as a ratio of an off-set (X, Y) of the earth surface between the adjacent frames n and n−1 and the time interval between the frames. Then, a known relative speed of the vehicle can be corrected by multiplication of the height of the camera (above the surface) by a coefficient that equals a ratio of the known vehicle speed and the measured camera speed.

According to the exemplary embodiment, the video matrix of the camera can have a relatively small resolution. The matrix can sense visible or an infra-red light. The matrix resolution is selected based on properties of the surface on which the vehicle moves. The choice of camera resolution generally depends on surface texture. The camera generally needs higher resolution for surface with fine texture. By way of example, QVGA (320×240 pixels) resolution can be enough for raw coil field with 2 m camera height above the surface. VGA (640×480) resolution is preferable for grass field with the same camera height. The matrix can output data about brightness and color of the signal. The information about the camera (and matrix) angle, camera view angles (including, for example, field of view) and camera height above the surface needs to be obtained. The height can be measured or set by a user. The angles are measured by an angular sensor (for example, an inclinometer). Processing of the video images can be performed on a CPU.

FIG. 1 illustrates side view of a video camera located on a vehicle, in accordance with the exemplary embodiment. A video camera 300 is placed on a vehicle 200 at a height L. The camera lens 500 has a field of view α. The camera 300 is pointed to a surface 100 at an angle β. The video data of the part of the surface 100 received through the lens 500 is projected onto the camera matrix and transformed into a sequence of the image frames. Current camera angle 400 changes as the vehicle 200 moves on the surface 100.

Thus, the angle β has to be measured for each image frame. Processing of the video data, in accordance to the exemplary embodiment, includes five stages. The first stage includes acquiring, by the video camera, of analog video data of a portion of the surface. Then the analog video data is converted by the camera matrix into a sequence of digital frames generated at certain time intervals.

The camera angle is measured at the point of generation of each digital frame. The camera field of view and camera height above the surface are measured for each frame as well. Analog to digital transformation needs to have at least 8 bits for each of the base color of the output signal (8-bit RGB) in order to provide an acceptable dynamic range of textural brightness of the surface. The digital frame image can be corrected to compensate for barrel distortion of camera lens. See http:** en.wikipedia.org/wiki/Barrel_distortion.

The second stage consists of generation of a simplified image for each image frame by approximation and filtering of the initial image, see, e.g., discussion below regarding transformation of a color image into a grey scale image, i.e., a B\W filter. This procedure can include pixel-by-pixel transformation of a color image into a grey scale image or a transformation of a monotone grey scale image into a binary image by comparing brightness of pixels of the initial image against a pre-set threshold value. The threshold value can be selected as an average value of brightness of all pixels. Simplification of the image frame allows for significant reduction of the volume of image data. It also simplifies further processing of the image by using logical or numerical operations, i.e., computation of cross-correlation function for two frames, when the system finds the image shift for two these frames.

Figure 2:
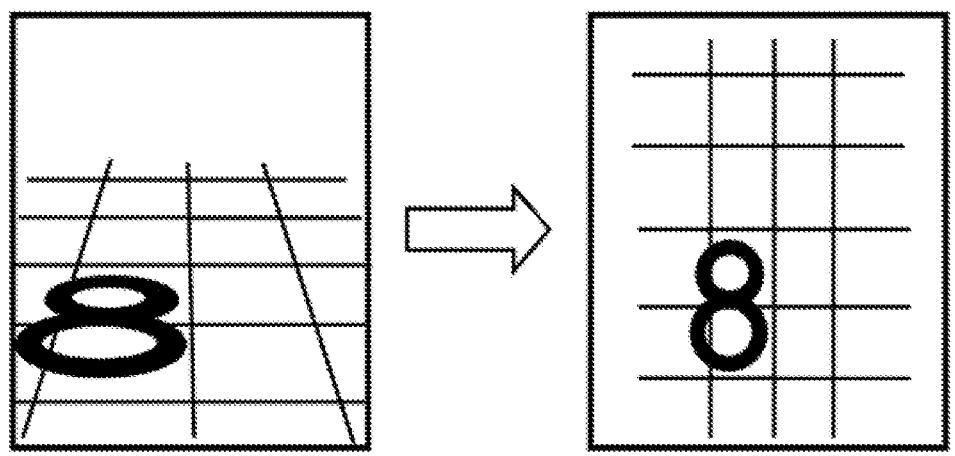
FIG. 2 illustrates correction of perspective distortions, in accordance with the exemplary embodiment.

The third stage consists of correction of perspective distortion based on the camera angle, the camera view field and the camera height. The correction of perspective distortions is shown in FIG. 2, see generally http:**en.wikipedia.org/wiki/Perspective_projection_distortion.

Figure 3:
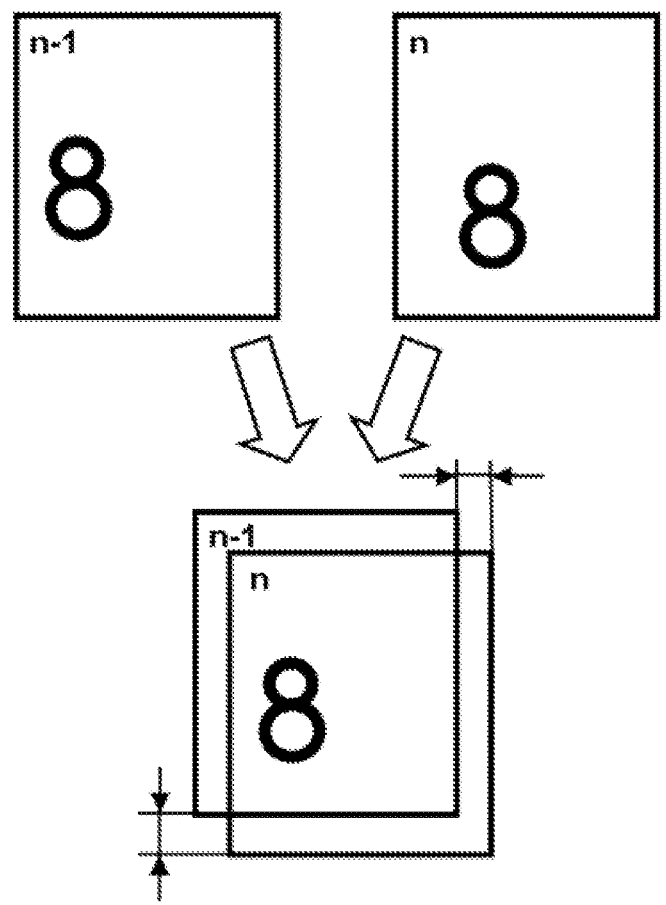
FIG. 3 illustrates a process of determining a relative off-set between the adjacent image frames having maximum coincidence of the images, in accordance with the exemplary embodiment.

The fourth stage includes operations that can be performed simultaneously or sequentially. The first operation is finding an off-set between the adjacent simplified video frames n and n−1 having maximum coincidence of the images. This operation is depicted in FIG. 3.

In order to optimize (and speed up) this operation, only pixels corresponding to the same portions of the simplified adjacent image frames can be used. Thus, finding of the off-set between the adjacent frames reduces to finding correlation maximum and determining its coordinates. Also, in order to reduce a range of search for the correlation maximum, for the simplified image frames (beginning with the third one), search for off-set between the adjacent frames n and n−1 and calculation of their correlation are performed only in the neighborhood area of the point of maximum coincidence of pairs of the simplified image frames n and n−1. The point calculated at the previous step is used.

Due to a discrete nature of the video matrix (i.e., a fixed distance between the pixels), coordinates of the correlation maximum do not precisely determine the off-set between the simplified image frames n and n−1. Correction of the off-set is performed by the approximation of the correlation peak by a parabolic function.

The second operation consists of calculating the correction value of the second off-set between the simplified image frames n and n−1 caused by changes in camera angle over a time interval between the image frames. This correction eliminates "shaking" of the video feed caused by changes in the camera angle that occur as the vehicle moves over uneven surface.

The fifth stage consists of calculation of the actual off-set of the surface image caused by camera movements. The off-set of the adjacent simplified image frames are calculated and corrected by the correction off-set value based on changes in the camera angle.

According to the exemplary embodiment, a relative camera speed can be calculated as a ratio of the off-set of the portion of the earth surface between the adjacent simplified frames and the time interval between the times when the corresponding initial images frames were taken. If a speed of the vehicle is known, calculation of the corrected value of the camera height can be performed by multiplication of the height value by the ratio of the known speed and the measured speed:

$L = L1 * V/V1$, where V1 is the camera speed, calculated as a ratio of the off-set of the portion of the earth surface between the adjacent simplified frames and the time interval between the frames; V is the actual speed of the vehicle; L1 is a distance from the camera to the surface measured at the beginning of taking of the video.

Alternatively, an aggregate off-set (i.e., traveled distance) of the camera during the entire time of video shooting can be calculated as a sum of the off-sets of all simplified image pairs. A simplified image frame can be created by transforming an infra-red image into monotone grey scale image. Contrast of final binary texture of surface can be higher if color image was recomputed in gray-scale using specific information about surface, for example, if the surface is almost green only, green color channel should be representing only for gray-scale.

According to the exemplary embodiment, the video camera can be calibrated using a calibration table prior to shooting the video. Correction coefficients for correction radial distortions can be determined for the camera ahead of time. Geometrical (radial) lens distortion can have a significant effect on the correction coefficients.

Having thus described a preferred embodiment, it should be apparent to those skilled in the art that certain advantages of the described method and apparatus have been achieved. In particular, those skilled in the art would appreciate that the proposed system and method provide for an efficient measurement of vehicle speed based on the movement of the video camera located on the vehicle.

It should also be appreciated that various modifications, adaptations and alternative embodiments thereof may be made within the scope and spirit of the present invention. The invention is further defined by the following claims.

What is claimed is:

1. A method for measuring movement of a video camera placed on a moving vehicle, the method comprising:
   (a) acquiring a sequence of digital frames of the earth surface;
   (b) correcting distortions of each frame;
   (c) correlating adjacent frames, wherein the frames have maximum coincidence; and
   (d) measuring off-set values between the adjacent frames, wherein:
      a simplified frame is created for each frame by approximation and filtering of the frame;
      distortions are corrected for each simplified frame based on the camera parameters associated with each frame;
      correlations of adjacent frames having maximum coincidence, are found;
      correction off-set value is calculated based on changes in the camera parameters during generation of the frames; and
      an actual off-set of portion of the surface is based on the off-set of the adjacent simplified frames corrected by the correction off-set value.

2. The method of claim 1, wherein the simplified frames are generated by transforming a color image into a monotone grey scale image.

3. The method of claim 1, wherein the simplified frames are generated by transforming a color image into a monotone color image.

4. The method of claim 1, wherein the simplified frames are generated by transforming a monotone grey scale image pixel-by-pixel into a binary image by comparing brightness values of all pixels against a pre-set threshold value.

5. The method of claim 1, wherein the simplified frames are generated by transforming an infra-red image into a monotone grey scale image.

6. The method of claim 1, wherein spherical aberration is corrected on the frames prior to generation of the simplified frames.

7. The method of claim 1, wherein the video camera is calibrated by using a calibration table and correction coefficients for spherical aberration are determined.

8. The method of claim 1, wherein portions of the adjacent simplified frames are used, wherein the portions have the same number and the same positioning of pixels.

9. The method of claim 1, wherein the finding of the correlation of the adjacent frames beginning from third is performed in neighborhood area of a point of maximum coincidence of images within the adjacent frames.

10. The method of claim 1, wherein the maximum correlation of the adjacent simplified frames is calculated by using an approximation function and by finding a correlation peak of this function.

11. The method of claim 10, wherein the approximation function is a parabolic function.

12. The method of claim 1, wherein the correlation of the adjacent simplified frames includes correlation of angles of the simplified frames having maximally coincident images.

13. The method of claim 1, further comprising calculating a current speed of the camera relative to the surface as a ratio of the off-set between the simplified frames and a time interval between the frames corresponding to the simplified frames.

14. The method of claim 1, further comprising correcting the camera height above the surface value by multiplying camera height by a ratio of known vehicle speed and a measured speed.

15. The method of claim 1, wherein the off-set of the camera is calculated as a sum of the off-sets between pairs of the adjacent simplified frames.

16. The method of claim 1, wherein the camera parameters include camera angle.

17. The method of claim 1, wherein the camera parameters include camera field of view.

18. The method of claim 1, wherein the camera parameters include camera height.

19. A system for measuring movement of a vehicle, the system comprising:

a video camera on the vehicle for generating images of an earth surface, wherein the video camera changes its angle relative to the earth surface as the vehicle moves over the earth surface;

a processing unit connected to the camera for processing the frames; and a device for measuring camera angles relative to the earth surface, wherein the processing unit approximates and filters the frames and calculates off-sets of earth surface images caused by changes in the camera angles relative to the earth surface, and wherein:

a simplified frame is created for each frame by approximation and filtering of the frame;

distortions are corrected for each simplified frame based on camera parameters;

correlations of adjacent simplified frames, wherein frames having maximum coincidence, are found;

a correction off-set value is calculated based on changes in the camera angle; and an actual off-set of a portion of the surface is calculated based on the off-set of the adjacent simplified frames corrected by the correction off-set value.

\* \* \* \* \*